(12) United States Patent
Ramirez Acosta et al.

(10) Patent No.: US 12,229,739 B2
(45) Date of Patent: Feb. 18, 2025

(54) SYSTEM AND METHOD TO MANAGEMENT A CRYPTOGRAPHIC BANKING NETWORK

(71) Applicant: QUANT BLOCKCHAIN BANKING SOLUTIONS LLC, Miami, FL (US)

(72) Inventors: Julio Alfredo Ramirez Acosta, Caracas (VE); Juan Jose Delgado Alvare, Miami, FL (US); Felipe Antonio D'Onofrio Ramirez, Lecheria (VE); Pedro Fernando Sandoval Sayago, Lecheria (VE); Angel Argenis Meléndez Cardoza, Baruta Caracas (VE)

(73) Assignee: QUANT BLOCKCHAIN BANKING SOLUTIONS LLC, Miami, FL (US)

( * ) Notice: Subject to any disclaimer, the term of this patent is extended or adjusted under 35 U.S.C. 154(b) by 185 days.

(21) Appl. No.: 17/700,797

(22) Filed: Mar. 22, 2022

(65) Prior Publication Data

US 2022/0300922 A1  Sep. 22, 2022

Related U.S. Application Data

(60) Provisional application No. 63/164,323, filed on Mar. 22, 2021.

(51) Int. Cl.
| | |
|---|---|
| *G06Q 20/10* | (2012.01) |
| *G06Q 20/06* | (2012.01) |
| *G06Q 20/36* | (2012.01) |
| *G06Q 20/38* | (2012.01) |
| *G06Q 20/40* | (2012.01) |

(52) U.S. Cl.
CPC ......... *G06Q 20/108* (2013.01); *G06Q 20/065* (2013.01); *G06Q 20/363* (2013.01); *G06Q 20/3674* (2013.01); *G06Q 20/3825* (2013.01); *G06Q 20/4016* (2013.01)

(58) Field of Classification Search
CPC .. G06Q 20/108; G06Q 20/065; G06Q 20/363; G06Q 20/3674; G06Q 20/3825; G06Q 20/4016; G06Q 20/0655; G06Q 20/4014
See application file for complete search history.

(56) References Cited

U.S. PATENT DOCUMENTS

| | | | |
|---|---|---|---|
| 2017/0154331 A1 | 6/2017 | Voorhees | |
| 2018/0025442 A1* | 1/2018 | Isaacson | H04L 51/48 705/26.62 |

(Continued)

FOREIGN PATENT DOCUMENTS

| | | |
|---|---|---|
| EP | 3557511 A1 | 10/2019 |
| KR | 20200094061 A * | 8/2020 |

OTHER PUBLICATIONS

"Stablecoins 2.0: Economic Foundations and Risk-based Models", Ariah Klages-Mundt, Oct. 21, 2020 (Year: 2020).*

*Primary Examiner* — Duan Zhang
(74) *Attorney, Agent, or Firm* — Gearhart Law, LLC

(57) ABSTRACT

The present solution relates to a system and methods to management a network where participate at least a bank, at least a client, and at least a regulatory body, whereas a series of operating protocols of said network, comprising; the creation of a cryptographic asset mirror of cryptocurrency, a management interactive node of said cryptographic asset. A crypto-assets clearance chamber for this solution is also disclosed.

17 Claims, 5 Drawing Sheets

(56) References Cited

U.S. PATENT DOCUMENTS

2018/0268401 A1* 9/2018 Ortiz .................... G06Q 20/326
2019/0220859 A1* 7/2019 Weight .................. G06Q 20/10
2020/0099512 A1   3/2020 Kikinis

* cited by examiner

SYSTEM AND METHOD TO MANAGEMENT A CRYPTOGRAPHIC BANKING NETWORK

RELATED APPLICATION

This Application is a U.S. Non-Provisional Patent Application that claims priority to U.S. Provisional Patent Application Ser. 63/164,323 filed on Mar. 22, 2021 the entire contents of which is hereby incorporated by reference in their entirety.

TECHNICAL FIELD

This invention is about a cryptographic banking network based on a private blockchain technology. Said cryptographic network uses a cryptographic asset that operate in a platform that allows to create and maintain a business network between institutions that custody cryptocurrency, and/or digital assets, allowing them a high mobility of the cryptographic assets for users and easy management, leaving each regulatory body custody of crypto assets

BACKGROUND

Cryptocurrencies such as Bitcoin for example, and the blockchain protocol have achieved a system that allows the exchange of a value between parties that do not know each other in a fast and efficient way, without the need for intermediaries. Despite its immaturity and the many challenges that it still poses, the financial industry has set its sights on this technology, which can be a great opportunity to generate new, more agile, lower-cost and more favorable banking services for its customers.

Some desirable aspects of any solution in this regard must be considered; security, reliability, transparency, agility, to ensure effective crypto asset management and custody.

The proposed invention operates in a banking ecosystem through which members can ensure the reliability of the services offered, since they are offered through a private blockchain network that allows transactions to be carried out in a more efficient, transparent, secure and reliable way, maximizing benefits for customers and generating profit margins for the financial entities that are part of the ecosystem. The purpose of the solution is to generate income for the members of the banking ecosystem that adopt it and that we will call "Network Participant".

The proposal assures network participants of compliance with the regulations and legal requirements of financial entities towards their private and corporate clients, as well as a set of best practices around local and international banking, among which are; Know your client (KYC), local and international anti-money laundering (AML), use of private Blockchain platform (whatever the provider), in order to ensure security and confidentiality.

In a general context, the proposed invention seeks to achieve the following general objectives:

Security, reliability and transparency in the custody and operations with cryptocurrencies.

Digitization of tangible financial assets in your custody.

Creation of sophisticated financial products through smart contracts.

From these general objectives, being derivate some specific objectives as explain follows:

One of the proposed goals is to achieve a ecosystem to encourage members of the network to balance, model and manage their crypto assets.

Another of the proposed goals is to propose a structure composed of microservices that serves as an interface between the applications of the network participants and the smart contracts, to manage the cryptographic and cryptocurrency assets.[1][2]

Another of the proposed goals is to create a crypto assets clearance chamber by means of smart contracts and the creation of a second private and permissive layer, said second layer connected to a first public cryptocurrency network.

Another of the proposed objectives is to implement cryptocurrency nodes in the banking Core of the network participants.

Other goal of the invention is the possibility of carrying out micro-transactions instantly and at a lower cost, between the users-participants These objectives are achieved through the incorporation of microservices structure that serves as an interface between the applications of the network participants and the smart contracts, to manage the cryptographic asset backed by cryptocurrencies and cryptocurrencies assets.

Through said microservices structure is possible to obtain a set of benefits, such as:

The proposal incorporates the "Blockchain as Service" modality, this scheme optimizes profitability for the member banks of the ecosystem, due to one of its main benefits, they will obtain income from the use of the platform without making capital investment in infrastructure, or expenses associated with its development.

The proposal makes available a PoC (Proof of Concept) in order to show the use and functionalities of the solution for which the functionalities are enabled as a Demo for the entities that start the operation of the ecosystem.

Being able to manage the ecosystem according to the present invention quickly and easily through the inclusion or withdrawal of new network participants.

Allow the creation of new channels of exchange between the network participants quickly.

The bank will not depend on other participants or external nodes to validate the transactions carried out and, in turn, the larger the business network, the different nodes will be able to validate their integrity with each other.

The incorporation and withdrawal of network participants in any or all of the communication and service provision channels.

The development of consensus rules for the participation or exclusion of any of the network participants in any of the existing channels.

The possibility of developing new exchange channels for the development of additional services.

The universality of the interface when it is linked to any other service of a third party.

The possibility of automatic netting between the network participants.

Being able to verify history and traceability of all operations between clients directly and quickly.

The possibility of creating additional chambers for additional specific services generated by the participants.

Timely liquidity, security of assets, minimization of costs in commissions and transparency in transactions are guaranteed.

The management of possible conditions and costs for the processes, and assets to be netted in the operating chamber.

As can be seen according to the effects that the implementation of the present invention would bring, the structure of microservices according to the present invention is adaptable and flexible to the business needs of a transaction network, keeping means of control available for the security and transparency of said transactions.

Where an ecosystem is the holistic manifestation of the system and process to management a cryptographic banking network, object of the present invention.

Said microservices structure being within a ecosystem, in particular said ecosystem includes; a cryptographic asset backed by at least one cryptocurrency deposited in a plurality of custodial wallets of the participating organizations, at least one banking body, at least one banking client, a cryptoactive clearance chamber, managed by a custodial regulatory body through smart contracts and the creation of a second private and permissive layer that interacts with a first public layer, and where;

In addition, the network includes at least one Application Programming Interface (API), a main book or computer file for recording and totaling economic transactions measured in terms of a monetary unit of account-by-account type (Ledger), a process by which banks obtain information about the identity and address of the customers (KYC), a plurality of master wallets, at least one smart contract that can be created, developed and implemented, at the end of a communication channel (endpoint) to allow interaction with the API, said endpoint to be developed and implemented.

The system to management a cryptographic banking network operates the data flows through the platform's substrates; hosting, blockchain, backend and frontend, in order to take advantage of the individual benefits in each one, and the global benefits of all of them as a whole. This in a general sense, in particular sense It'll show later as an architecture layers.

Some nearby technologies are known from the prior art, without necessarily being considered interfering with respect to the present invention. Some of them are shown below:

For example, EP 3 557 511 A1 (Treccani et al), discloses a method for validating a transaction of a crypto-asset, the method is executed by a processing apparatus and at least one hardware security module (HSM), wherein the method defines N first level keys and T second level keys, wherein each first level key comprises a public first level key and a private first level key, wherein each second level key comprises a public second level key and a private second level key, wherein the T private second level keys are stored in the at least one hardware security module (HSM), wherein the method comprises the steps of: providing, in the processing apparatus, transaction data comprising transaction details relating to the transaction of a crypto-asset of a distributed ledger, the N public first level keys and the T public second level keys; receiving a minimum number M of first level signatures from M signatories; checking, in the at least one hardware security module, if the transaction details fulfil at least one security policy, if the transaction details fulfil the at least one security policy, creating, in the at least one hardware security module, a minimum number S of second level signatures based on S of the T private second level keys; and sending, by the processing apparatus, the transaction data, the M first level signatures and the S second level signatures to a node of the distributed ledger to publish the transaction of the crypto-asset in the distributed ledger.

Another example is, US 2020 099512 (Kikinis) that discloses a system and method providing a security gateway for high security blockchain systems, that acts as a firewall (and manages users, rules, data access, transactions, fees, etc.), has the ability to understand and enforce blockchain business processes policies (access policy and transaction policy of a blockchain solution that may or may not support smart contracts), and can understand tokens and their functionality, without totally disabling code execution, for example from smart contracts or tokens enabled by smart contracts.

Finally, US 2017 154331(Voorhees), discloses one or more servers automatically, based on a set of predetermined rules, executes a mechanism allowing blockchain-asset exchange customers to place standing-limit or market orders for blockchain-based digital assets (e.g., cryptocurrencies) with a counter-party, but without counter-party risk. The counter-party will not receive the payment until the customer's exchange order has been executed, and the customer has taken possession and ownership of the desired asset. The customer cannot reverse payment or otherwise rescind the payment from the counter-party once the customer receives the desired asset. The systems and methods use blockchain databases, multisignature key signing procedures, and a transparent, objective, automated, rules-based software agent to manage and autonomously govern transfer of digital blockchain-based assets in a multi-party exchange scenario, without risk of asset loss and without the discretion of any human actor.

None of the aforementioned prior art documents is made up of a microstructure of services that operates within a ecosystem, as is characterized to the present invention Some definitions and acronyms are necessary for fluency in the explanation of the technique according to the present invention, as set forth below:

API's is the acronym, plural form, for Application Programming Interface, which is a software intermediary that allows two applications to talk to each other.

CC according with present invention means cryptocurrency

Qcc, according to the present invention, means a cryptographic asset backed by the CC deposited in the custodial wallets of the participating organizations. The processes of deposits, withdrawals, movements and interbank transfers will be carried out among the participants of the network, managing a single accounting book, safe, reliable and immutable, without the need to reconcile accounts with offsetting processes over time, optimally covering liquidity needs among clients and updating balances in any moment.

KYC means Know Your Customer, and is a process by which banks obtain information about the identity and address of the customers AML, means Anti-Money Laundering, and is closely related to the KYC process (Know your Customer) is a user identification process to prevent money laundering Ledger means, the principal book or computer file for recording and totaling economic transactions measured in terms of a monetary unit of account-by-account type.

Client, Bank client, customer, or user are equivalents terms.

Bank participants, financial entities, financial participants, or Bank entities are equivalents terms.

Regulatory body, or Regulatory entity are equivalents terms.

The ecosystem is a distributed technological system made up of entities or actors that self-organize to generate scalable and sustainable benefits. Said ecosystem is made up of the following actors;

A Blockchain Platform: is a managed platform offering blockchain as a service (BaaS) in an environment that includes Platform Cloud and that allows the development, operation and management of a network with the necessary performance, availability and security.

Network of Participants: refers to any organization or individual licensed to use the services of the Cryptographic Network in accordance with the present invention, to offer them to their clients, through their platforms and tools. The participants have credentials in the cryptographic network in accordance with the present invention that authorizes them to use and provide services through it. In principle, it is comprised of corporate financial entities.

Legal Treasury: refers to an area or team established by the network participant that will be responsible for the creation and management of the portfolios of the participating financial entity, in addition to the custody of the private keys. A legal and highly responsible management procedure for these activities is recommended for the custody of a very important security asset for the operation of its crypto assets and those of its clients.

Cryptocurrency network: The ecosystem contemplates active and backup Core cryptocurrency nodes for each participant, in order to create portfolios and generate CC accounts for their clients to guard them and support the crypto-financial products and assets managed in the network.

Transactions: refers to the way in which any network operation, event or service is recorded so that participants can create, exchange, modify and destroy assets.

Customers: are those people who are customers of the participants and access the network through the banking portal and APP of the financial institution.

With the implementation of any cryptocurrency nodes in the banking core of the network participants, the possibility of opening accounts in cryptocurrency and making transfers between the network organizations is opened, guaranteeing the security of the wallets and minimizing the costs in commissions of net.

DETAILED DESCRIPTION

Figure 1:
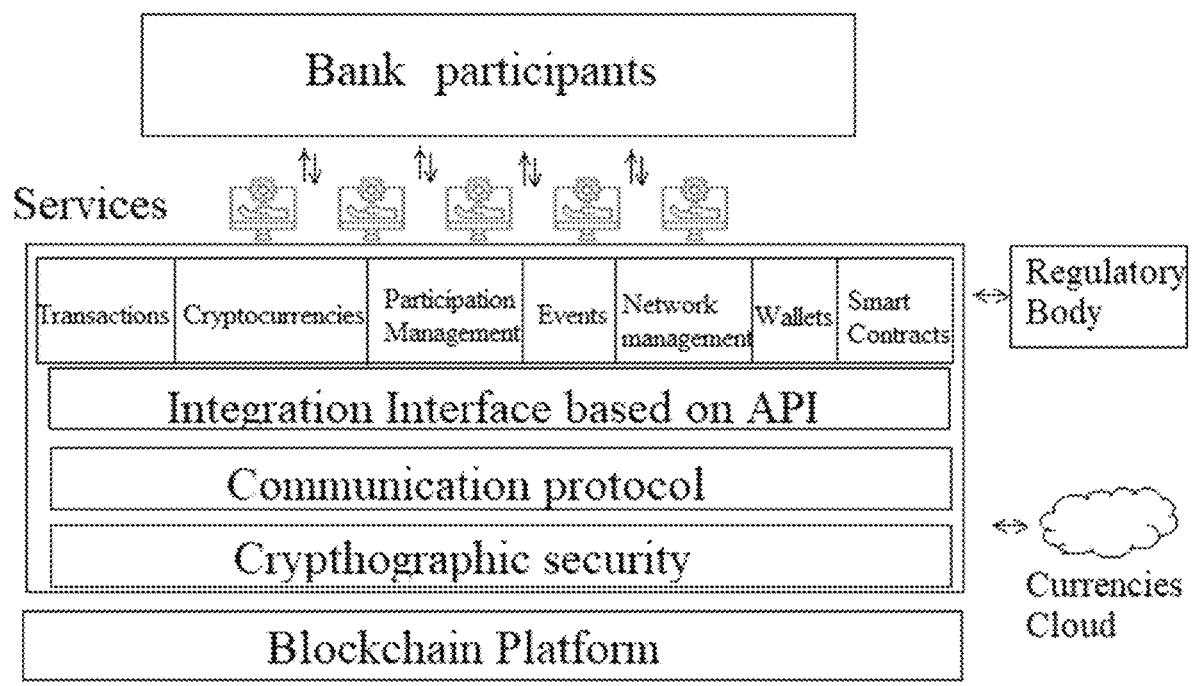
FIG. 1 is about architecture layers according to the cryptographic banking network
FIG. 2. Is about CC deposit process and Qcc creation.

Some invention characteristics could be explained as follows with assistant of drawings 1 to 4.

In preferred embodiment the system to manage a cryptographic banking network according to present invention, comprising a system, wherein said system comprises; a cryptographic asset backed by at least one cryptocurrency deposited in a plurality of custodial wallets of the participating organizations, at least one banking entity, at least one banking client, a cryptoactive clearance chamber, managed by a custodial regulatory body through smart contracts and the creation of a second private and permissive layer that interacts with a first public layer, and where there is also at least one Application Programming Interface (API), a main book or computer file for recording and totaling economic transactions measured in terms of a monetary unit of account-by-account type (Ledger), a process by which banks obtain information about the identity and address of the customers (KYC), a plurality of master wallets, at least one smart contract that can be created, developed and implemented, at the end of a communication channel (endpoint) to allow interaction with the API, said endpoint to be developed and implemented.

Where said System is characterized by;

The cryptographic asset allows the implementation of a cryptographic node (Qcc) that allows the management of cryptocurrencies in interface with the APIs, where the processes of deposits, withdrawals, movements and interbank transfers will be carried out between the participants of the network, managing a single accounting book, safe, reliable and immutable, without the need to reconcile accounts with untimely clearing processes, optimally covering liquidity needs among clients and updating balances in real time.

In another preferred embodiment the cryptographic monetary network is a system based on an architecture that comprise; a blockchain platform, a network of participants, a legal treasury at least on for each participant, a cryptocurrency network, a transactions set, at least one customer.

In other preferred embodiment the cryptographic monetary network is a system that includes a layers architecture, wherein said layers interact with each other in a descending and ascending linear sense according to the data flow, where said layers mentioned in ascending order are; blockchain platform, security cryptographic, communication protocol, and Integration Interface based on API, and also external interactive to regulatory body and currency cloud. See FIG. 1.

This Integration Interface, comprising at least the following services; Authentication, Account management, Management of Signatures/Signatories, Portfolio/wallet management, Contact management, Fund management, Transaction management, and Message management.

In another embodiment the system to manage a cryptographic banking network is a system with a functional structure, which components are;

At least four participants (4): three active and one for observation. The first three organizations will be banks and the fourth will emulate the regulatory body, which will monitor all withdrawal operations, deposits, physical movements and interbank transfers of assets (Qcc), events and identity issues.

The system to manage a cryptographic banking network to management of Qcc assets, where each financial institution will have two (2) nodes, one active and one passive backup, these nodes correspond to the platforms in which the wallets are stored, in this way based on 3 organizations configure six (6) equal nodes Authorizers and certificate generators (CA), in total Five (5) distributed as follows; One for each organization: three (03) banks, one (01) regulatory body and one (01) for an ordering service.

Channels, in total Two (2): refers to the communication channels for each of the transactions for each cryptoactive, there is one made up for the organizations that manage Qcc, the other channel will link the regulatory body with the banks for the monitoring of events.

An Ordering Service composed of at least 5 nodes.
Smart contracts, created and developed for asset management.

Core Interface, which is an application interface (API) that exposes microservices, its main function is the integration between the legacy systems of the banks and the assets in the Network.

Legacy Systems or Core Banking, that are systems or platforms of said entities in which interbank currency deposits, withdrawals and movements are recorded in cash, and update the network ledger through the core interface.

Cryptocurrency wallets, which are virtual wallets in which crypto assets can be managed, and which are designed to store or manage cryptocurrency keys, in this network there must be three wallets for each participant or financial institution called: Active, Compensation and Cold, each with a purpose.

USDT wallet or also called US Tether is considered within the stablecoins or stable cryptocurrencies, one of its functions is that the cryptocurrency is always worth 1 dollar (1 USD $)

Optionally the system to manage a cryptographic banking network consider uses another stable digital money different to dollar for other purposes In another embodiment the system to manage a cryptographic banking network includes an instant messaging operation and service on P2P network linked or integrated with the system to manage a cryptographic banking network according with the invention.

Another embodiment comprises that each network participant must create and manage at least three wallets, where each wallet is as follows;

A first wallet, that is an active wallet, where each client deposit CC, and store the private key under control by the cryptographic banking network.

A second wallet, that contains CC to transfer between banks participants.

And a cold wallet, that is doesn't online available respect to the cryptographic banking network, and doesn't have external stolen risk.

This cold wallet is recommended to storage the banks participant of network, or for storage VIP CC.

Each bank participant must create a wallet once a time, each wallet is stored at Qcc nodes in order to guarantee a backup availability by online synchronicity.

The security wallet manages consist in a private key generated of at least twelve characters encrypted and validated by QR code generated, where said QR code is generated by the cryptographic banking network when the respective wallet was created This private key must be physically supported by respective bank vault through a security protocol.

The security wallet manages incorporates a single seed generated for each wallet created, which is recorded in order to realize a double authentication.

In order to restore any seed generated that lost it, the security wallet manages comprises a protocol based on retrieve keywords, or charactered codes, or combination thereof.

Also, in another embodiment of invention all the operations on the Qcc nodes will be written in the Ledger of the monetary transactions network, and through KYC, the creation of accounts in cryptocurrencies is managed.

In another embodiment, the invention incorporates the Blockchain as Service modality It also comprises a macro level of a process to operate that includes the steps of;
Develop API's and Smart contracts.
Qcc Deposit Manage and Qcc creation
A transaction within the network.
Manage a crypto asset clearinghouse
Each step contains a respective process that is explained below:
API's and smart contracts developed
The APIs that must be developed for the management of CC and Qcc through the network are mentioned.
Likewise, the smart contracts must be created and invoked to interact with the network.

The APIs that must be developed for the management of CC and Qcc through the network are at least the follows: authentication, account management, management of signatures/signatories, portfolio/wallet management, contact management, fund management, transaction management, message management, node management.

A set of master wallet per Qcc node with their respective physical and logical security layers.

KYC process to generate account in any cryptocurrency

API's in the Qcc core interface for managing CC, that includes following steps:

Receive CC through the cryptocurrency network.

Make the move or send-from to transfer CC through the cryptocurrency network.

Signature management

Send cryptocurrency through the business network

Each step before cited has sequentially sub-steps, that are:

For receive Cryptocurrency through the cryptocurrency network, must be following steps:

Generate cryptocurrency address associated with the customer's account at the business network.

Track the cryptocurrency address for the check in of the cryptocurrency received.

For make the move or send-from to transfer CC through the cryptocurrency network, must be following steps:

Get the contact's cryptocurrency master account

Validate account, be it from the same bank or from another bank.

The signature management consists of configuring and obtaining signatories for the transfers approval through the business network and cryptocurrency network.

For send cryptocurrency through the business network, must be following steps:

Obtain signatures to authorize the operation

Validate business network contact

Register the transfer of the asset in the ledger.

For the development and implementation of smart contracts, all operations on the Qcc nodes will be written in the Ledger of the business network, for which the following tasks must be met:

Generate addresses to receive outside the business network.

Make deposits outside the business network

Manage network contacts.

Move or send-from from the addresses created to receive CC through the cryptocurrency network to the master wallets Make transfers between customer accounts of different banks or the same bank.

Management of parity between the master's wallet and cryptocurrency addresses generated for bank clients to receive CC through the cryptocurrency network.

Later, the management processes for this asset will be specified.

Operational process

Below are the banking processes for the cryptocurrency custodian service, as well as the performance of the business network according to the present invention to ensure articulation between the participants, guaranteeing timely liquidity, security of assets, minimization of commission costs and transparency in transactions. Basically, there are three (3) main ones, first there is the process of depositing CC and creating Qcc, secondly there is the transaction process within the network, and finally the process of withdrawing CC from the network.

This process is the same for whatever cryptocurrency that are going to be added to the network CC Deposit Process and Qcc creation As can be seen at FIG. 1, the network participants are; a first Bank 10, a second Bank 20, a third Bank 30, a regulatory body 40, a Qcc node 50, and a client 60, Each path is numbered from 1 to 8, according to each step from a to h, described below, so the process that is carried out consists of the following steps:

(a) The client makes a transfer of CCs to his wallet guarded by a first Bank 10.

(b) The CCs are received in the client's wallet guarded by said first Bank 10

(c) The first Bank's 10 Qcc Node validates the incoming CC transaction.

(d) The deposit is registered through an endpoint activating the smart contract for the deposit of CC creating the same amount of CC that were transferred to the wallet.

(e) Qcc node 50 validate transactions and client status using a consensus algorithm.

(f) The record is created in the Ledger with the defined structure.

(g) The new Block is added to the existing Block chain so that the operation is kept unalterable and permanent.

(h) The Regulatory body 40 only receives the events of the execution of smart contracts through the channel.

Figure 2:
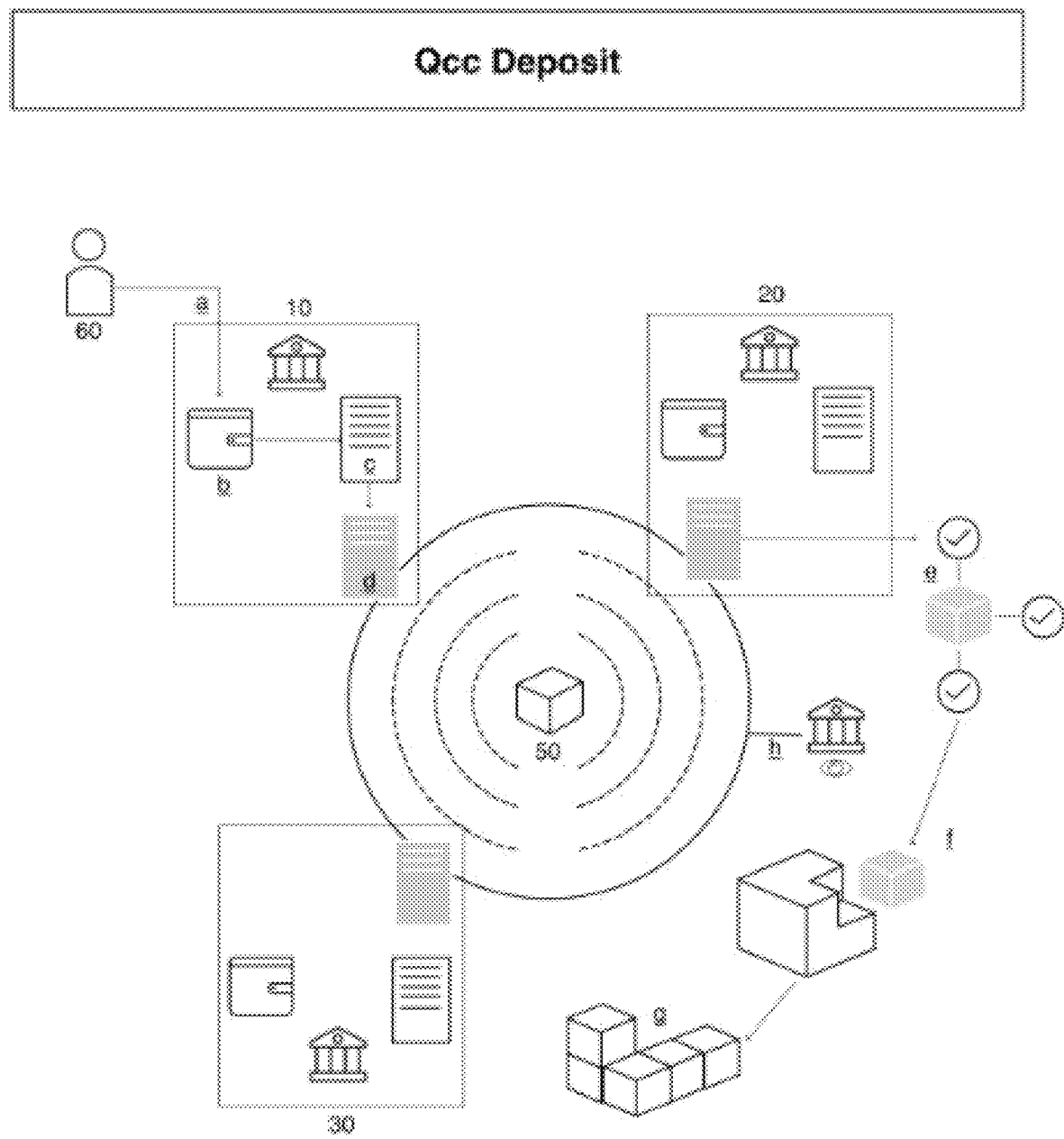
Figure 3:
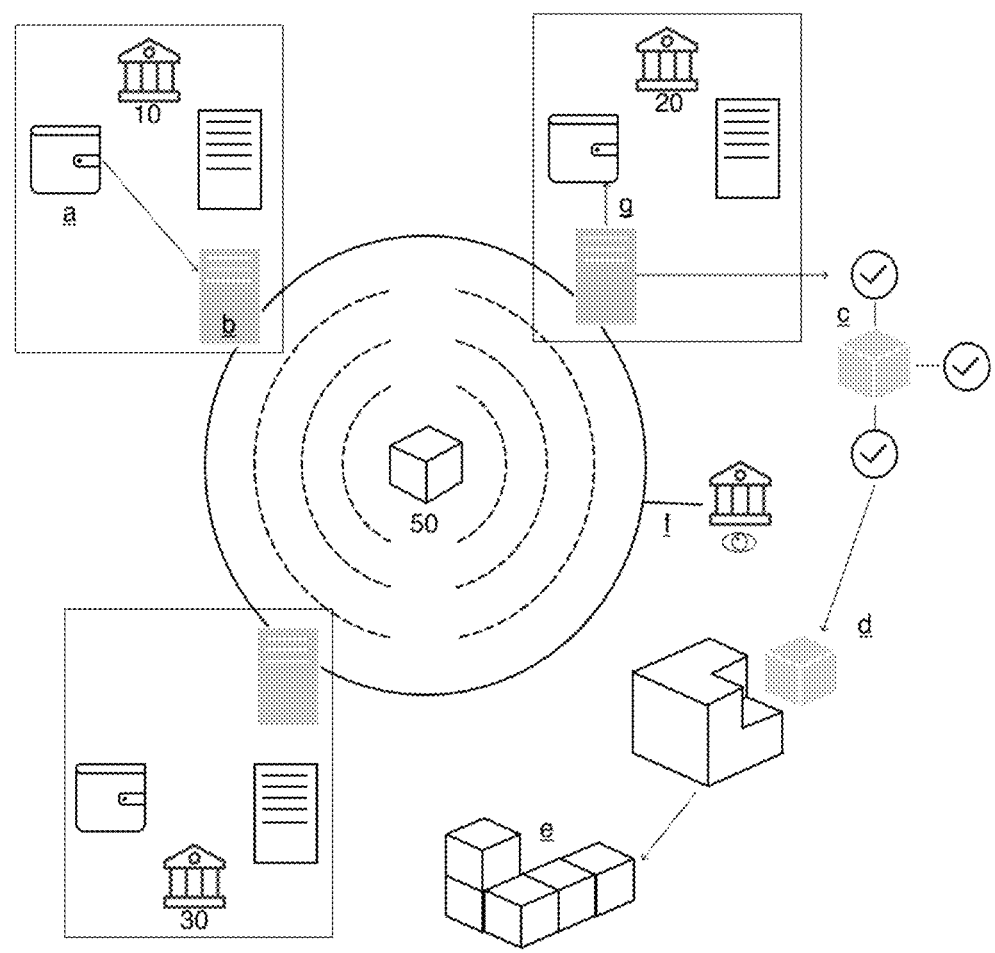
FIG. 3. Shows Qcc transfer process within the network
Figure 4:
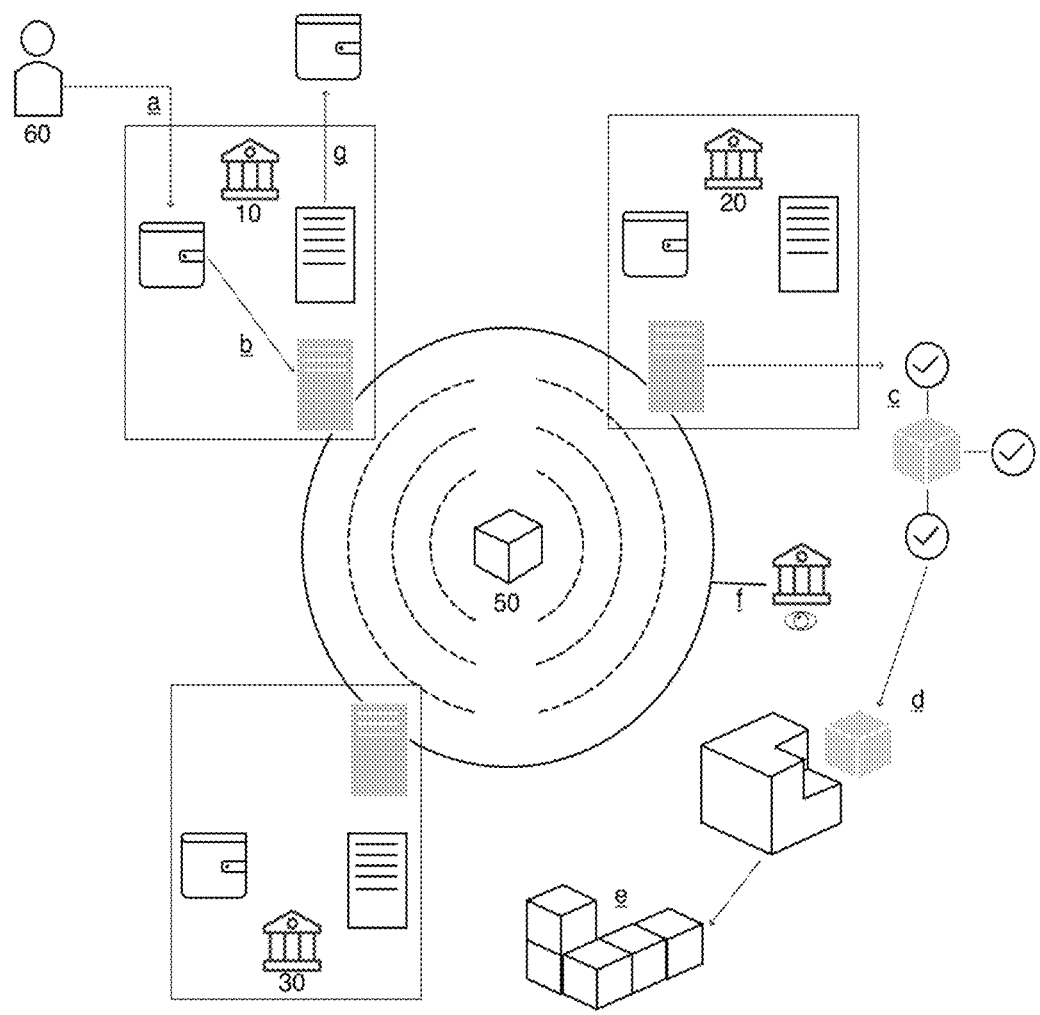
FIG. 4 shows withdrawal of CC from the network.

There is no restriction regarding the number of banks or clients that join the network, as well as that other regulatory bodies may participate. FIGS. 1 and 2 are only an example, without a restrictive character, to know the fundamentals of the solution proposed here.

Transaction process within the network.

As seen at FIG. 2, the network participants are; a first Bank 10, a second Bank 20, a third Bank 30, a regulatory body 40, and a Qcc node 50, Each path is numbered from 1 to 7, according to each step from a to g, described below, so the process that is carried out consists of the following steps:

(a) first Bank 10 consumes Balance endpoint that activates the smart contract to read the Balance if it has a balance and requests a transfer of CC to second Bank 20

(b) said first Bank 10 records transaction in the business network through endpoints that activates the smart contract for CC transfer between banks.

(c) The Qcc node 50 validate the transactions and the client's status using a consensus algorithm and, according to the approval policies, authorize the request.

(d) The record is created in the transfer ledger with the appropriate structure. This triggers the smart contract for bank reconciliation, keeping track of debits and debts between banks.

(e) the new block is added to the existing block chain in such a way that it remains unaltered and permanent.

(f). The regulatory body 40 only receives events from the execution of smart contracts through the channel.

(g). the bank client can see the transfer received and his new balance in CC in his account.

Withdrawal of CC from the network

This process can be followed for its understanding based on what is illustrated in FIGS. 1 and 2, in terms of the network participants. The process consists of the following steps, a to g:

(a) The client requests the withdrawal of CC from his custodial wallet with first Bank 10

(b) said first Bank 10 performs the registration of the withdrawal transaction through an endpoint which activates the intelligent withdrawal contract in the Qcc nodes 50.

(c) Qcc nodes 50 validate transactions and client status using a consensus algorithm.

(d) The record is created in the ledger with the appropriate structure. this triggers CC Withdrawal smart contract and Qcc destruction (e) the new block is added to the existing chain of blocks so that it remains unchanged and permanent.

(f) The regulatory body 40 only receives events from the execution of smart contracts through the channel.

(g) The Bank 10 sends the CC to the wallet indicated by the client 60

Crypto-assets clearance chamber

It is based on smart contracts and the creation of a second private and permissive layer, the second layer interacting with the public cryptocurrency network. The process to achieve this is based on the following steps, from a to g:

(a) The cryptographic assets wallet is transferred to the custody wallet.

(b) Once received these cryptographic assets, Qcc, it is created within the private network an asset mirror or backed in the CC received, where Qcc=1 CC (c) Once the respective intelligent contract is executed and these Qcc is generated, the user will be able to see his balance available in CC reflected in the balance sheet, which they may use to exchange between other users belonging to the network.

(d) When a user transfers CC to another user within the network, a CC debt is created between the Qcc custody institutions, for this through an intelligent contract, the debits and credits are reconciled in order to arrive an amount established between the parties or maximum once a day is reconciled and the corresponding transfers are made between the wallets and all of this is controlled by smarts contract.

(e). When the client wishes to leave the network and transfer their Qcc to a CC wallet, a request is made to the financial institution to proceed with the transfer. once the CC transfer is destroyed, the Qcc assets are destroyed to maintain the balance and parity between CC assets and Qcc assets, the Qcc assets existing in the network cannot be different from the CC custoded by network bodies (f) As a security characteristic of the network is the existence of regulatory participants 50 or observers who can ensure the correct operation.

(g) The participants of this network have each one of them known identities so that you can know who participates in the network by eliminating the pseudo anonymity that exists in the CC traditional network.

Figure 5:
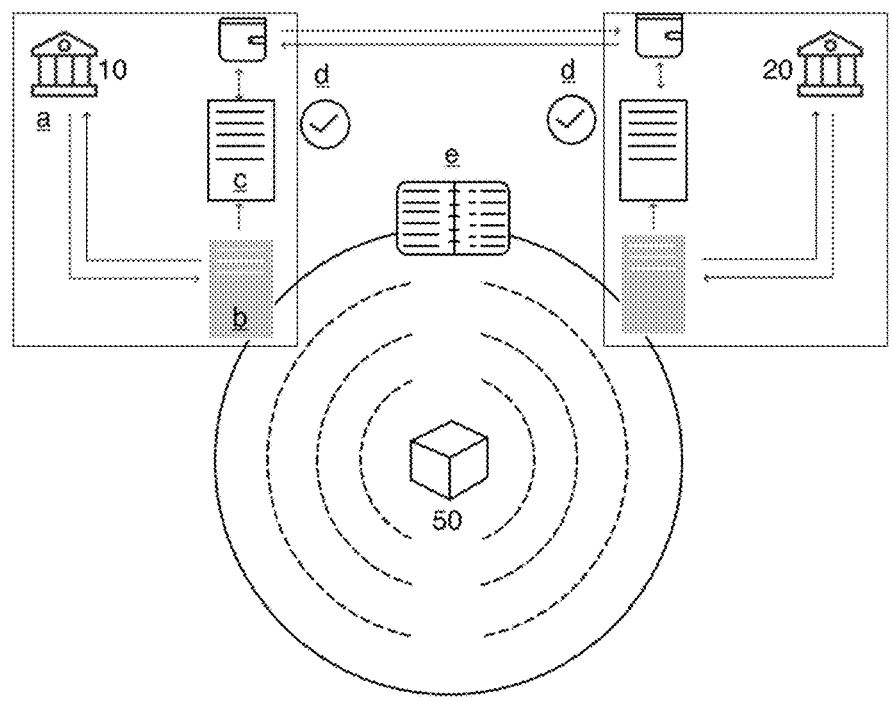
FIG. 5 is about crypto-assets clearance chamber.

An alternative embodiment about Crypto-assets clearance chamber according to FIG. 5, is explained below by following steps:

(a) The bank according to the periodicity starts the batch process of clearance established (b) Confirm the accounting balances in CC (c) Make the CC movements to the master wallet to the bank nodes (d) The move and sendFrom operations are validated (e) Write operation in Ledger

The invention claimed is:

1. A system to manage a cryptographic banking network enabling a regulatory body to monitor all bank cryptocurrency transactions, said system comprising:

a set of cryptographic assets, each referred to as a QCC (cryptographic node) asset, backed by at least one cryptocurrency (CC) deposited in a plurality of custodial wallets of a set of banks;

a blockchain with a ledger for the QCC assets, wherein each of the banks conduct all cryptocurrency (CC) transactions by conducting equivalent QCC transactions over the blockchain in order to ensure such transactions are monitored by the regulatory body;

a cryptoactive clearance chamber managed by the regulatory body through smart contracts, wherein the regulatory body has a node linked to the blockchain configured to monitor all withdrawal operations, depositors, physical movements, and interbank transfer of all types of cryptography conducted by the banks, wherein the ledger is accessible to the regulatory body and is configured to record and total economic transactions measured in terms of a monetary unit involving cryptocurrency (CC) transactions conducted by the banks, wherein the system is configured to provide a process by which the banks obtain information about identity and addresses of their customers (KYC), which information is shared with the regulatory body via the blockchain; and at least one application program interface (API) through which the blockchain is accessed for the cryptocurrency (CC) transactions, wherein the cryptocurrency (CC) transactions including deposits, withdrawals, movements and interbank transfers are carried out by the banks and are monitored by the regulatory body via the blockchain, wherein the system is configured to manage the ledger, which is a single accounting book, safe, reliable and immutable, without a need to reconcile accounts of the banks with any untimely clearing processes, wherein the system further comprising;

computing devices uniquely identified with at least four participants, three active participants and one for observation, wherein the three active participants comprise the banks, wherein the one for observation comprise the regulatory body, which is configured with a node of the blockchain configured to monitor all withdrawal operations, deposits, physical movements and interbank transfers of assets and identity issues for customers performing transactions with the banks;

a set of cryptographic monetary network nodes for the management the QCC assets, where each of the banks has two of the cryptographic monetary network nodes, one active and one passive backup;

a set of certificate generators, wherein each of the banks comprises a certificate generator of the set of certificate generators and the regulatory body comprises a certificate generator of the set of certificate generators;

at least two channels, one channel for the banks, the other channel for the regulatory body;

an ordering service composed of at least five nodes;

a set of smart contracts, created and developed for asset management;

a core interface, which is an application interface (API) that exposes microservices, its main function is the integration between legacy systems of the banks and QCC assets;

a set of legacy systems or core banking, that are systems or platforms in which interbank currency deposits, withdrawals and movements are recorded in cash;

a set of cryptocurrency wallets, which are virtual wallets in which crypto assets are managed, and which are designed to store or manage cryptocurrency keys, wherein each of the banks and the regulatory body are associated with three wallets for each participant or financial institution called: Active, Compensation and Cold, each with a purpose; and a USDT wallet storing stablecoins.

2. The system to manage a cryptographic banking network according to claim 1, wherein all the cryptocurrency operations performed by each of the banks occurs via a bank specific QCC node and are written in the ledger as one of the QCC transactions.

3. The system to manage a cryptographic banking network according to claim 1, wherein, know your customer (KYC) rules are applied to a creation of accounts of the banks within which customer owned cryptocurrencies are managed.

4. The system to manage a cryptographic banking network according to claim 1, is a system based on an ecosystem that comprise:
   a blockchain platform including the blockchain,
   a network of participants including the banks and the regulatory body,
   a cryptocurrency network, and
   a transaction set for at least one customer of each of the banks.

5. The system to manage a cryptographic banking network according to claim 1, is a system that includes a layers architecture, wherein layers of the layers architecture interact with each other in a descending and ascending linear sense according to a data flow, where said layers mentioned in ascending order are: a blockchain platform layer, a security cryptographic layer, a communication protocol layer, an Integration Interface layer based on an application program interface (API), and an external interactive layer to the regulatory body and a currency cloud.

6. The system to manage a cryptographic banking network according to claim 5, wherein said Integration Interface layer comprising at least the following services: authentication, account management, management of signatures/signatories, portfolio/wallet management, contact management, fund management, transaction management, and message management.

7. The system to manage a cryptographic banking network according to claim 1, wherein the stablecoin is not based on a United States Dollar.

8. The system to manage a cryptographic banking network according to claim 1, wherein the smart contracts are configured to create new financial products.

9. The system to manage a cryptographic banking network according to claim 1, wherein an instant messaging operation and service based on P2P network is integrated with the system to manage the cryptographic banking network.

10. The system to manage a cryptographic banking network according to claim 1, wherein each of the banks and the regulatory body create and manage at least three wallets, where each wallet is as follows;
   a first wallet, that is an active wallet within which CC assets are deposited and asset specific private keys are stored under control by the cryptographic banking network;
   a second wallet, that contains the QCC assets, which are configured to be transferred between banks; and,
   a cold wallet, which is offline with respect to the cryptographic banking network.

11. The system to manage a cryptographic banking network according to claim 1, wherein each of the banks must create a wallet stored at a QCC node in order to guarantee a backup availability by online synchronicity.

12. The system to manage a cryptographic banking network according to claim 1, wherein the security wallet comprises a private key of at least twelve characters, which is encrypted and validated by a generated QR code, wherein said QR code is generated by the cryptographic banking network when the respective wallet was created.

13. The system to manage a cryptographic banking network according to claim 12, wherein the private key must be physically supported by one of the respective banks through a security protocol.

14. The system to manage a cryptographic banking network according to claim 13, wherein the security wallet incorporates a single seed generated for each wallet created, which is recorded and validated in order to realize a double authentication.

15. The system to manage a cryptographic banking network according to claim 14, wherein in order to restore any seed generated that became lost, the security wallet comprises a protocol based on retrieve keywords, characters codes, or combinations thereof.

16. The system to manage a cryptographic banking network according to claim 1, which incorporates a blockchain-as-Service modality.

17. The system to manage a cryptographic banking network according to claim 1 wherein, the blockchain utilizes a proof of concept enabled as a demo when in operation.

* * * * *